: 3,310,061
Patented Mar. 21, 1967

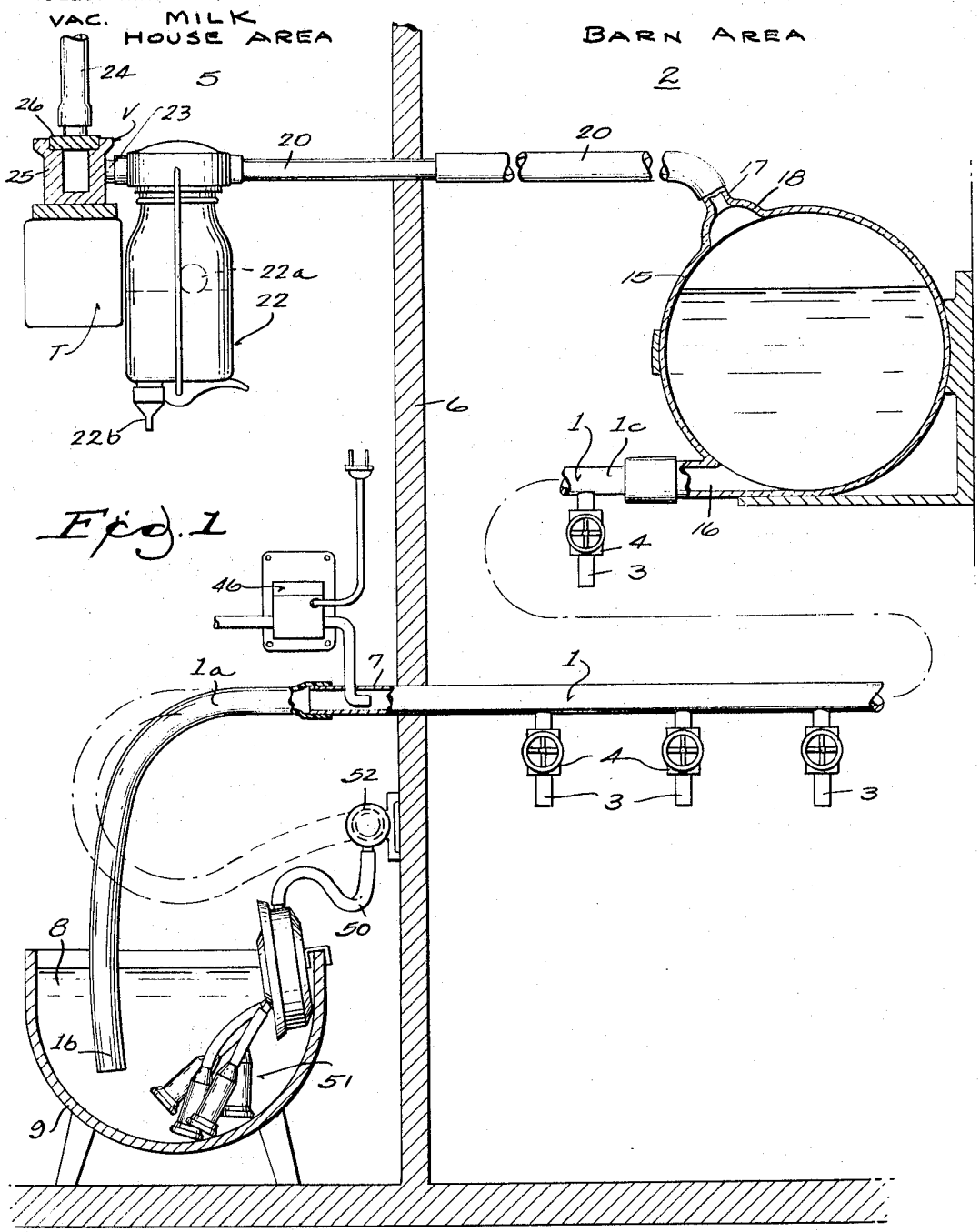

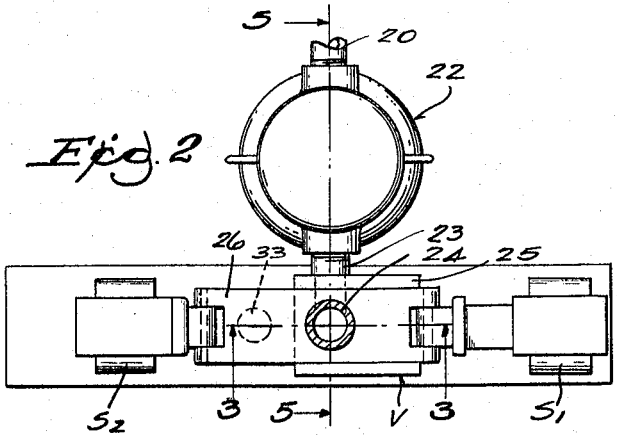
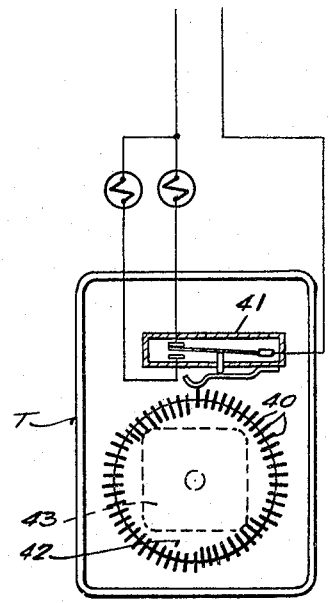
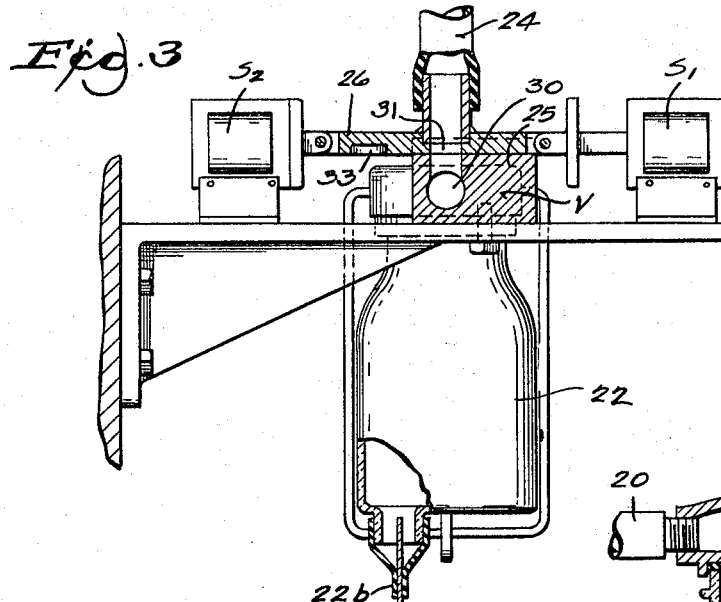
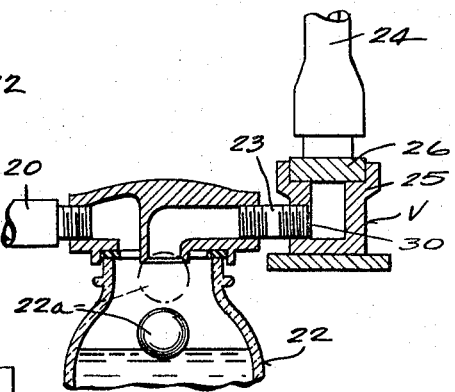
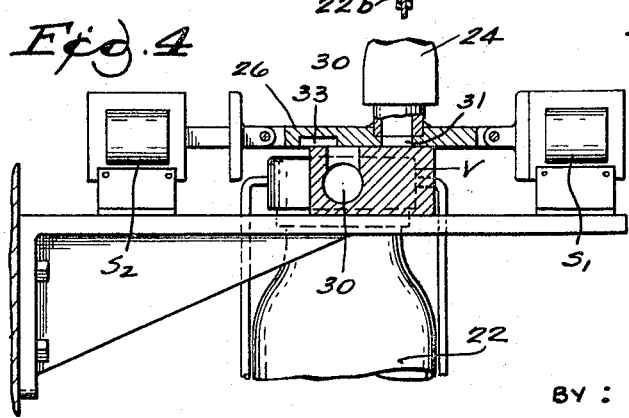
INVENTOR:
LLOYD F. BENDER
BY: James E. Nilles
ATTORNEY

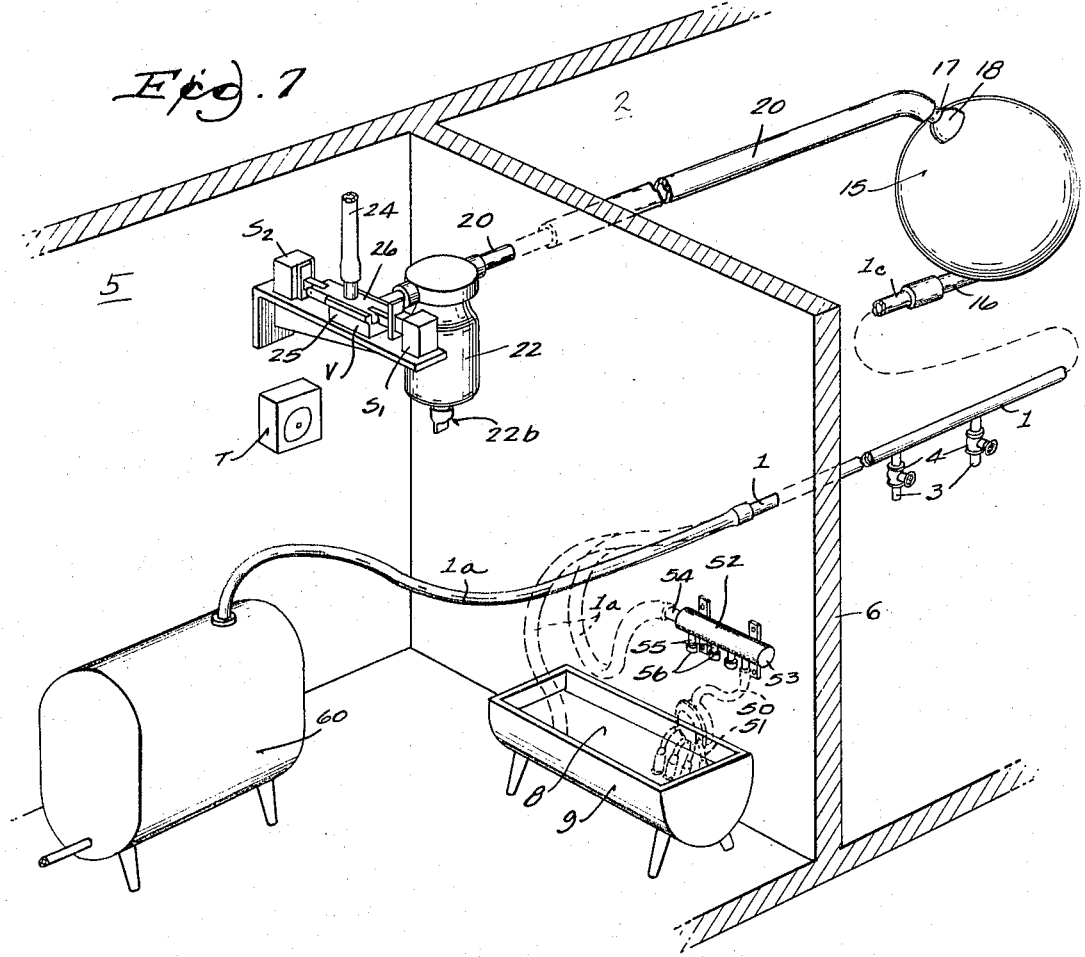
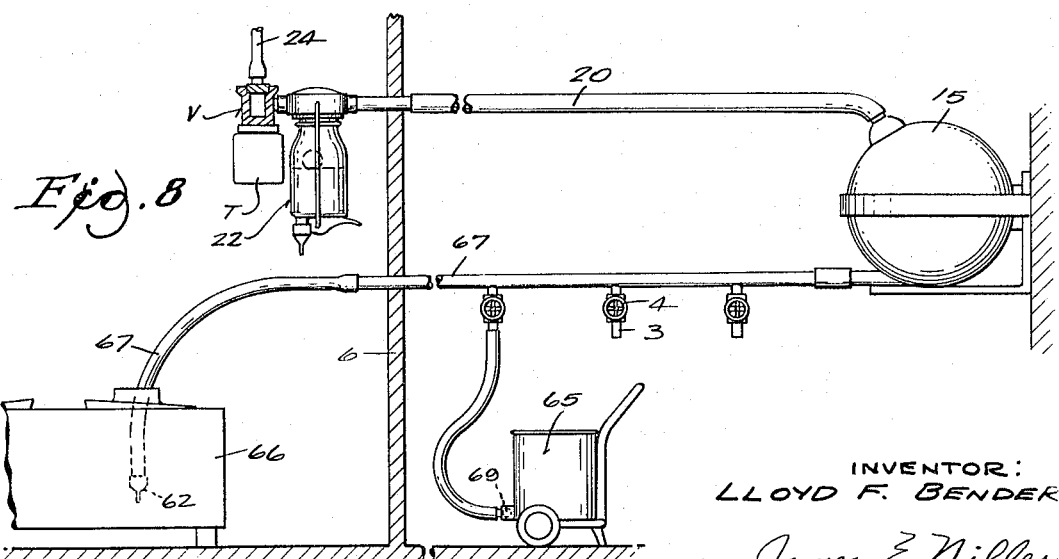

3,310,061
MILK LINE EQUIPMENT
Lloyd F. Bender, Hayward, Wis. 54843
Filed Mar. 26, 1965, Ser. No. 443,055
2 Claims. (Cl. 134—58)

This invention relates generally to dairy equipment such as cleaning apparatus for milk lines and liquid pumping mechanism for transporting milk from one tank to another.

One aspect of the present invention relates to an improved cleaning apparatus for a milk line system which eliminates contaminated air, such as is present in a barn, from the milk line. The improved system also eliminates the necessity for a return milk line with the necessary additional hangers; the system also provides in-place cleaning, eliminates all mechanical parts in the system which would otherwise require cleaning, and permits a more simple valve arrangement for regulating and timing the application of vacuum to the system. The arrangement is such that it is possible to have the cleaning solution tank and the said valve arrangement in the milk house where the air is not contaminated.

Another object of the present invention is to provide a liquid pumping mechanism including a fluid accumulator which is connected to an electrically operated valve means through which valve means the accumulator is alternately subjected to vacuum and then atmospheric pressure to create a fluid pumping action; this structure permits the accumulator to be located in the barn area where the air may be contaminated and be sealed against the entry of such air.

Another object is to provide an improved accumulator which is completely and easily cleaned in place, and which has a novel vacuum outlet that minimizes fluid being drawn from the accumulator by the vacuum.

These and other objects and advantages will appear hereinafter as this disclosure progresses, reference being had to the accompanying drawings in which:

FIGURE 1 is a more or less schematic, elevational view of apparatus embodying the present invention, certain parts being shown in section or removed for clarity;

FIGURE 2 is a plan view of a portion of the device as shown in FIGURE 1, but on an enlarged scale;

FIGURE 3 is an elevational view of the FIGURE 2 device, but showing a part of it in cross section, the cross-sectional view taken along line 3—3;

FIGURE 4 is a fragmentary view similar to FIGURE 3, but showing the valve moved to the atmospheric pressure position;

FIGURE 5 is a cross-sectional view taken along line 4—4 in FIGURE 2;

FIGURE 6 is an enlarged view of the timer shown in FIGURE 1, certain parts being shown in section;

FIGURE 7 is a perspective view showing a milking system which incorporates the present invention and showing how the milk line is used for conveying milk to a vacuum bulk tank and during which time the washing apparatus of the present invention is inoperative; and FIGURE 8 shows the device when used to convey milk from a portable tank to a bulk tank.

Referring in greater detail to the drawings, the apparatus as shown in FIGURE 1 is set up for cleaning a milk line 1 which may extend for a considerable length in the barn area 2, and which has a series of milk inlet conduits 3 to which are attached the various milking machines (not shown) throughout the barn. A valve 4 is provided for each milk inlet conduit so that when the apparatus is being cleaned, as will be described, the conduits 3 are closed.

A milk house area 5 is located at a separate location from the barn area and has been shown here as being separated by a wall 6. The air in the barn may be contaminated and contain dust or other foreign matter while the milk room air is clean and its cleanliness and sanitation regulated by various state laws.

One end of the milk line 1 extends into the milk room 5, and its end 7 is adapted to reveice a flexible tube 1a which is often made of plastic. When the milk line 1 is to be cleaned, the end 1b of tube 1a is immersed in a cleaning solution 8 in tank 9.

The other end 1c of the milk line is connected to and in fluid communication with a fluid accumulator 15 by means of the solution inlet 16 located at the lowermost end of the accumulator. A vacuum inlet 17 is provided adjacent the upper side and has an enlarged portion 18 which is generally semi-spherical in shape for purposes that will appear later. A vacuum line 20 is connected to the accumulator conduit and then extends through wall 6 and into the milk house 5 where it is connected to a fluid trap 22. It should be mentioned that vacuum line 20 is inexpensive and easily installed as compared to the milk line 1. It will also be noticed that only a single milk line is necessary, that is to say, it is not necessary to have a second milk line return from the sealed accumulator 15, which may be located at the other end of the barn, back to the milk house 5.

The fluid trap has a ball 22a therein which can float on the solution, and in the event the trap becomes full, the ball will seal at the suction opening (as shown by the dotted line in FIGURE 5) and cut off the suction. The trap also has a flapper valve 22b which opens to dump any fluid in the trap when the suction is cut off.

The trap 22 is also in communication via conduit 23 with a slide valve V. The valve V in turn is in communication via conduit 24 with a source of vacuum (not shown).

The valve V is of the slide plate type having a body 25 and slide 26, the slide being actuated by solenoids S1 or S2 to place the line 20 under vacuum or open to atmosphere. In this manner, the accumulator is alternately subjected to a vacuum or open to atmosphere via valve V.

More specifically, the valve body has a right angle passage 30 in communication with line 20 and which can be placed in communication with the vacuum supply conduit 24 via a hole 31 in the slide 26 when the latter has been shifted by solenoid S2 to the position shown in FIGURE 3.

When the valve slide 26 has been shifted by solenoid S1 to the position shown in FIGURE 4, passage 30 and consequently line 20 and accumulator 15 are open to atmosphere via the recess 33 in the slide, as shown. In this position, the vacuum source line 24 is blocked by the valve body.

The electric solenoids are actuated by the electric timer T which may be of the conventional one-minute repeater type which has a series of tabs 40, each representing one second, which tabs can be manually set so as to clear or abut against a micro-switch 41 as the wheel 42 on which they are mounted rotates. This timer includes an electrically driven motor 43 which drives the wheel 42 in the known manner. With the timer set as shown, the tabs are arranged to provide a period of twenty seconds for the suction to be applied directly to the accumulator.

An air injection timer 46 is connected to the line 1 adjacent its end near the solution source so as to permit slugs of air to be drawn in with the solution to facilitate the cleaning action. If a more complete description of this air injection timer 46 is desired, reference may be had to my U.S. Patent No. 3,139,107, issued June 30, 1964, entitled, "Fluid Handling Apparatus for Milk Pipeline Washing System."

Before describing the operation of the cleaning apparatus, it is desired to note that the present invention can also be used to thoroughly clean milker lid cleaning assemblies such as are shown and described in detail in my U.S. Patent No. 3,173,434, issued Mar. 16, 1965, entitled "Milker Lids Cleaning Apparatus," and reference may be had to that patent if thought to be necessary. It is believed sufficient to say that the conduits 50 (FIGURE 1) leading from these assemblies 51 can be placed in communication with a manifold 52 which is fixed to the wall 6 in the milk house. This tubular manifold is closed at one end 53, and the end of the plastic tube 1a can be slipped snugly over the other end 54 of the manifold. Downwardly extending nipples 55 provide a convenient means for attaching conduits 50 by slipping the latter thereon. Suitable caps 56 close the unused nipples.

In the cleaning operation, the valves 4 are closed, and the end of tube 1a is inserted in tank 9. The cleaning solution from tank 9, along with air from timer 46, are drawn into line 1, and the accumulator substantially fills with solution. Any excess solution that gets in line 20, usually as vapor, is trapped by the trap 22. The timer T is set for the desired interval to actuate the solenoids alternately and cause the accumulator 15 to be subjected to suction or atmosphere.

Referring again to the enlarged end 18 of the suction conduit 17 of the accumulator, this substantially prevents the solution from being drawn into the line 20 as the accumulator is filling. I have found that such an enlargement 18 breaks up the film of solution that sloshes across that area due to the applied suction while the accumulator is filling. Thus, instead of being drawn into line 20, the solution is broken up across the relatively wide area of portion 18, and the suction can be drawn through this area without carrying the solution along with it. This device functions as an effective air velocity reducer for the vacuum line.

The solution and air slugs are pulsated back and forth in the line 1 to provide good scouring action. After cleaning, the suction is cut off by the valve and timer, and the solution then all drains back to the tank 9.

In order to return the milk line 1 to a milking operation, the end of the line 1 is placed in a vacuum bulk tank 60, and the valve V shut off so as to block the source of vacuum from conduit 24. Valves 4 are opened, and the suction in tank 60 causes the milk from the conduits 3 to flow to the vacuum bulk tank 60. The apparatus provided by the present invention is not used under this milking condition.

FIGURE 8 shows the apparatus of the present invention as used to transfer milk from a portable tank 65 located out in the milking area and to a bulk tank 66, this being desirable when no vacuum bulk tank is available. The timer T is set so that the accumulator substantially fills through the milk line 67 with milk from tank 65, the flapper valve 62 on the end of milk line 67 being closed by the suction. Then, the timer causes valve V to vent accumulator 15 to atmosphere, the one-way check valve 69 in the bottom of tank 65 closes, and the milk in line 67 is discharged out valve 62 in tank 66. The cycle is repeated until the tank 65 is empty.

With the present invention, there are no mechanical parts in the line to clean, and no contaminated air from the barn can enter the system.

Various modes of carrying out the invention are contemplated as being within the scope of the following claims particularly pointing out and distinctly claiming the subject matter which is regarded as the invention.

I claim:

1. A milk line cleansing system for a barn area and a separate milk house area, said system comprising, a cleaning solution tank in said milk house area, a solenoid operated valve means located in said milk house area and connected to a source of vacuum, an electric motor driven timer for actuating said solenoid operated valve means, a sealed fluid accumulator located in said barn area and having a lower fluid opening and an upper vacuum and air opening, a milk line extending through said barn area and terminating at one end in fluid communication with the lower opening of said accumulator and the other end adapted to terminate in said solution tank in said milk house area, said other end of said milk line constituting a long flexible conduit which can be moved from said solution tank to other tanks, said valve means including a shiftable valve element, flexible conduit means connected directly to and shiftable with said valve element for connecting it to said source of vacuum, another conduit placing said upper opening of said accumulator in communication with said valve means, said valve means including a vent to atmosphere and being shiftable between a position in which said accumulator is in communication with said vacuum source and a second position in which said accumulator is in communication via said conduit means with atmospheric air in said milk house area.

2. Liquid pumping mechanism comprising, a liquid accumulator having a fluid opening at its lower end and an opening adjacent its upper end, fluid conduit means connecting said lower fluid opening with a source of fluid, said conduit means at that end remote from said accumulator including a long flexible conduit adapted to be moved between different sources of fluid, slide valve means in communication with said accumulator via said upper opening, a fluid trap located between said upper opening and said slide valve means and including a one-way check valve in the bottom of said trap for dumping fluid therein when said trap is exposed to atmospheric pressure, said slide valve means having a shiftable slide element, a flexible conduit connected directly to said slide element for sliding therewith and connecting it to a source of vacuum, electric solenoid means for shifting said slide element between a position in which said accumulator is connected with and subjected to said source of vacuum and a position in which said accumulator is vented to atmosphere whereby said accumulator is alternately subjected to vacuum and atmosphere to create an intermittent fluid pumping action through said fluid conduit means, an electric motor driven timer for actuating said solenoid means whereby when a predetermined amount of fluid has been accumulated in said accumulator due to vacuum therein, said timer will cause said solenoid means to shift said valve means to an accumulator venting position to cause said accumulated fluid to flow from said accumulator by gravity.

References Cited by the Examiner

UNITED STATES PATENTS

| | | | |
|---|---|---|---|
| 1,562,770 | 11/1925 | Jamieson | 119—14.07 |
| 2,496,470 | 2/1950 | Hodsdon | 137—205 |
| 2,733,667 | 2/1956 | Hill | 103—236 |
| 2,871,821 | 2/1959 | Golay | 119—14.07 |
| 2,897,828 | 8/1959 | Bender | 134—56 |
| 3,091,252 | 5/1963 | Jones | 137—392 |
| 3,111,112 | 11/1963 | Fjermestad | 119—14.07 |
| 3,119,401 | 1/1964 | Merritt et al. | 134—57 |
| 3,122,149 | 2/1964 | Hauk et al. | 134—58 |
| 3,191,576 | 6/1965 | Bender | 119—14.07 |
| 3,224,413 | 12/1965 | Patterson | 119—14.07 |

ALDRICH F. MEDBERY, *Acting Primary Examiner.*

SAMUEL KOREN, HUGH R. CHAMBLEE, *Examiners.*